United States Patent [19]

Matsui et al.

[11] Patent Number: 5,195,032
[45] Date of Patent: Mar. 16, 1993

[54] DEVICE FOR DESIGNATING A PROCESSING AREA FOR USE IN A TRANSLATION MACHINE

[75] Inventors: Takashi Matsui, Tondabayashi; Yoji Fukumochi, Nara; Shuzo Kugimiya, Nara; Ichiko Nakamura, Nara; Tokuyuki Hirai, Yamatokooriyama; Hitoshi Suzuki, Nara, all of Japan

[73] Assignee: Sharp Kabushiki Kaisha, Osaka, Japan

[21] Appl. No.: 643,699

[22] Filed: Jan. 22, 1991

Related U.S. Application Data

[63] Continuation of Ser. No. 288,439, Dec. 22, 1988, abandoned.

[30] Foreign Application Priority Data

Dec. 24, 1987 [JP] Japan ................. 62-333573

[51] Int. Cl.⁵ .................... G06F 15/28; G06G 7/60
[52] U.S. Cl. .................................. 364/419
[58] Field of Search ........................... 364/419

[56] References Cited

U.S. PATENT DOCUMENTS

| 4,406,626 | 9/1983 | Anderson et al. | 364/419 |
| 4,460,973 | 7/1984 | Tanimoto et al. | 364/419 |
| 4,468,754 | 8/1984 | Asada et al. | 364/900 |
| 4,685,060 | 8/1987 | Yamano | 364/419 |
| 4,814,987 | 3/1989 | Miyao et al. | 364/419 |
| 4,814,988 | 3/1989 | Shiotani et al. | 364/419 |

FOREIGN PATENT DOCUMENTS

| 0201096 | 12/1986 | European Pat. Off. . | |
| 0163036 | 9/1983 | Japan | 364/419 |
| 0081727 | 5/1984 | Japan | 364/419 |
| 0208637 | 11/1984 | Japan | 364/419 |
| 0245072 | 12/1985 | Japan | 364/419 |
| 0262264 | 12/1985 | Japan | 364/419 |
| 0223987 | 9/1988 | Japan | 364/419 |
| 2177242 | 1/1987 | United Kingdom . | |
| 2193358 | 3/1988 | United Kingdom . | |
| 2193362 | 3/1988 | United Kingdom . | |
| 2199680 | 7/1988 | United Kingdom . | |

Primary Examiner—Roy N. Envall, Jr.
Assistant Examiner—Ari M. Bai

[57] ABSTRACT

A sentence processing device used in a translation machine comprises sentence number input keys by which a block containing a plurality of sentences to be processed can be designated by inputting the sentence number assigned to the respective source sentences. All of the sentences included only in the designated block can be automatically consecutively processed.

16 Claims, 3 Drawing Sheets

DEVICE FOR DESIGNATING A PROCESSING AREA FOR USE IN A TRANSLATION MACHINE

This application is a continuation of application Ser. No. 07/288,439 filed on Dec. 22, 1988, now abandoned.

BACKGROUND OF THE INVENTION

1. Field of the Invention

The present invention relates to a designation area processing device used in an electronic translation machine. Any area or areas can be designated that only the designated areas can be sequentially processed for printing, translation, deletion or spell check e.g..

2. Description of the Prior Art

In the prior art, there is known electronic translation machine that functions as described hereinafter. A source language entered by operating keys on a key board is entered in a translation module under the control of a main central processing unit (referred to as CPU hereinafter), so that the entered source language mentioned above is translated into a target language by the translation module using a consulting dictionary (CD), grammatical rules (GR) and tree construction conversion rules (TCCR) which are stored in a memory. In the conventional translation machine as mentioned above, the area of the sentences which can be designated for performing the process of sentence such as printing, translation, deletion and spell check is limited to one sentence, entire sentences of the document or all the sentences after position identified by a cursor.

Therefore, where a part of the document is to be processed, if the part includes several sentences, the operation of the sentence processing must be repeated on every sentence, otherwise, the cursor must be moved to the head position of the head sentence in the designated part so that all the sentences after the cursor position are processed and the sentence processing is interrupted at the end of the last sentence of the designated part. The operation necessary for the operator as mentioned above has been very troublesome.

SUMMARY OF THE INVENTION

An essential object of the present invention is to provide a block designation device for use in a translation machine in which a part of a document including a plurality of source sentences can be designated so that the entire designated part can be consecutively processed with a simple operation.

In order to accomplish the object mentioned above, the block designation device for use in a translation machine according to the present invention comprises;

block designating means for designating at least a start point and end point of a block in a source document;

judging means for judging whether or not the block to be processed is already designated; and means for consecutively processing all of the sentence or sentences included in the block designated by said block designating means when said judging means judges that the block is designated.

That is, any block or blocks of the source sentences each having a sentence number to be processed are designated, so that the numbers of the head and bottom sentences of the designated blocks are entered by the block designating means in order to process the designated blocks without processing the undesignated blocks in the source document.

When it is judged, by the judgment means that the block of the sentences to be processed is designated by entering the numbers of the head and bottom sentences of the block to be processed in the source document, the designating means consecutively performs the processes of the sentences in the block designated by the numbers of the head and bottom sentences of the block in the source document.

Accordingly, a plurality of designation blocks can be integrally consecutively processed in the source document without performing a process on every sentence or moving the cursor to the position of the head sentence of the designation block so as to process all the sentences after the cursor position, interrupting the process at the bottom sentence of the designation block.

DETAILED DESCRIPTION OF THE PREFERRED EMBODIMENT

A preferred embodiment of the present invention will be described with reference to the attached drawings.

Figure 1:
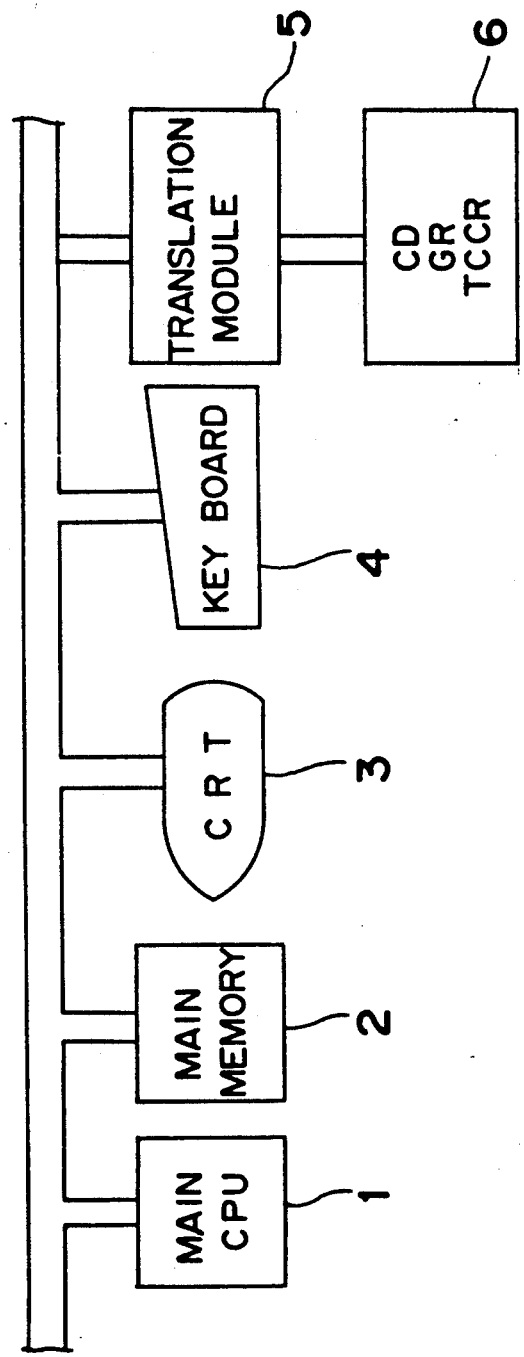
FIG. 1 is a block diagram showing an embodiment of a translation machine in which a device according to the present invention is employed.

In FIG. 1, there are shown a main CPU 1 comprising judgment means and designated block processing means, a main memory 2, a cathode ray tube (referred to as CRT hereinafter) 3, a key board 4, a translation module 5, and a memory 6 storing a consulting dictionary (CD), grammatical rules and tree construction conversion rules (TCCR).

The translation module 5 translates an input source language into an output target language. That is to say, the source language entered by operating the keys on the key board 4 is sent to the translation module 5 under the control of the main CPU 1. The translation module 5 translates the entered source language into a target language using the consulting dictionary CD, grammatical rules GR and tree construction conversion rules TCCR which are stored in the memory 6 as to be described below. The translated sentences in a target language through the process of the translation module 5 are once stored in the main memory 2 and are displayed on the CRT 3.

Figure 2:
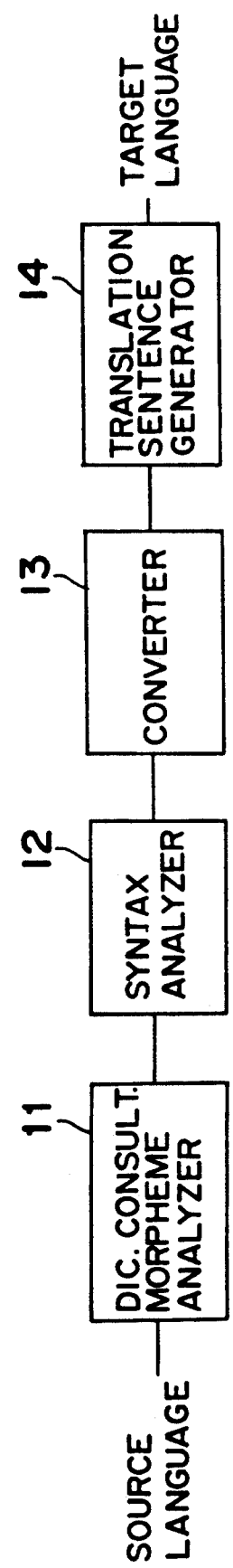
FIG. 2 is a block diagram of a translation module used in the translation machine shown in FIG. 1, and FIGS. 3 and 4 are flow charts showing an operation for designating a partial area of a document.

The operation of the translation module 5 is explained with reference to FIGS. 1 and 2.

First, the entered source sentence is divided into various kinds of arrays of respective morphemes (arrays of words) by using the consulting dictionary CD in the memory 6 through a dictionary consulting morpheme analyzer 11 so as to obtain grammatical data such as parts of speech and translation word for each of the words, and furthermore, the time, person and number of the subject are analyzed Next in a syntax analyzer 12, a syntax analyzing tree representing relations between the respective words is decided according to the consulting dictionary CD and the grammatical rules stored in the memory 6.

In a converter 13, the construction of the syntax analyzing tree for the entered source sentence is converted to a syntax analyzing tree for a translated sentence using the TCCR in the memory 6 Subsequently in a translation generator 14, joshi in Japanese (a postpositional word functioning as an auxiliary to a main word) and auxiliary verbs proper for the target language are added to the translated sentence, so that the translated sentence is generated from the translation module 5 and is stored in the main memory 2 and displayed in the CRT 3.

Next, there will be explained hereinafter the process of designation of the area for performing the document process such as the translation using the translation module 5, printing, deletion, and spell check, with reference to the flow chart shown in FIG. 3.

Before the description proceeds, it is noted that each of the source sentences in the translation machine is serially, automatically or manually numbered in the order that the number of the sentence increases as the sentence proceeds.

In the step S1, the number of the head sentence in a desired block in the source document is entered by the key board 4 which is referred to as a block designation sentence number input means, and set in the translation machine.

In the step S2, the number of the bottom sentence in the desired block in the source document is entered by the key board 4 and set in the translation machine.

By the operation in the steps S1 and S2, the desired block is designated. For example, assuming that there are sentences NO. 1 to NO. 20 in one document. If the operator wants to process the sentences NO. 5 to NO 10, the operator enters the numeric number 5 as the head sentence number and numeric number 10 the bottom sentence number, whereby a block from NO. 5 to NO. 10 is designated.

In the step S3, a block designation flag is set "on", whereby the operation of the block designation is completed.

Figure 4:
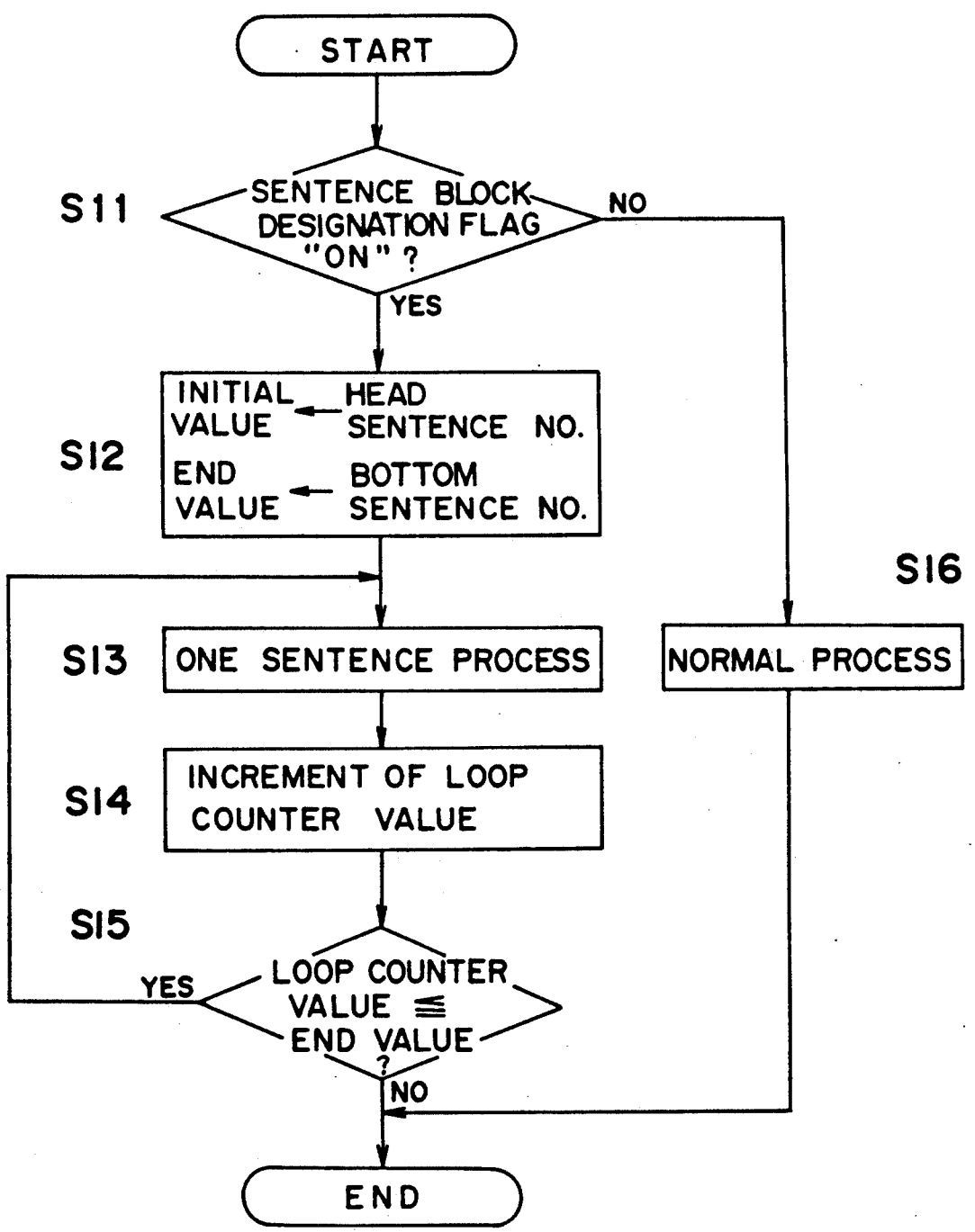

Next, the operation for the document processing of the designated block is explained with reference to the flow chart shown in FIG. 4.

It is judged in the step S11 whether or not the block designation flag is set "on". When the flag is set "on", the program goes to the step S12, and in case the flag is not set "on", the program goes to the step S16.

Figure 3:
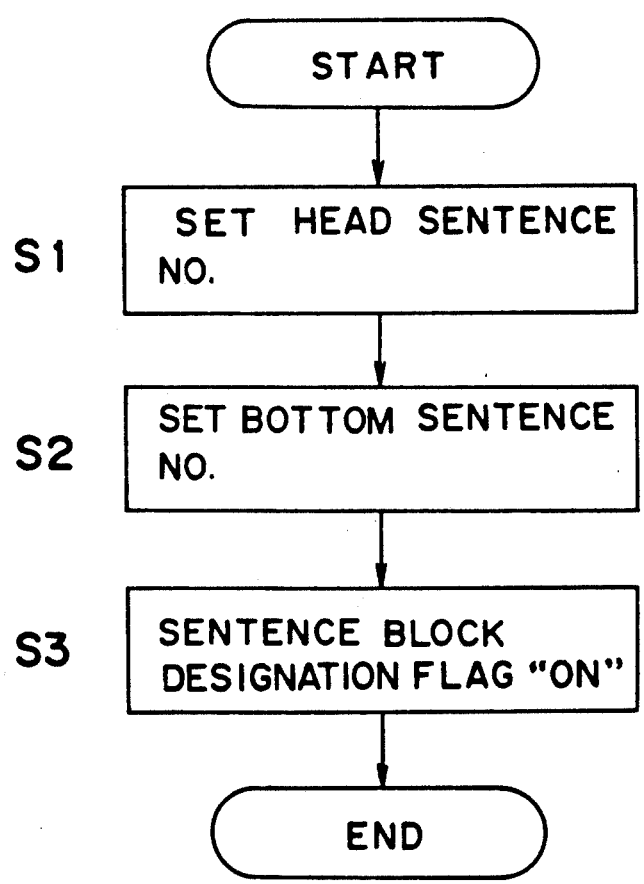

In the step S12, the number of the head sentence set in the step S1 shown in FIG. 3 is substituted for an initial value of a loop counter and the number of the bottom sentence set in the step S2 is substituted for the maximum value of the loop counter.

In the step S13, only the sentence having the same sentence number as the count value of the loop counter is processed by e.g. printing, translation, deletion and spell check.

In the step S14, the count value of the loop counter is increased.

In the step S15, it is judged whether or not the count value of the loop counter is smaller than the maximum value corresponding to the bottom sentence number designated in the step S12. In case the count value of the loop counter is smaller than the maximum value, the program goes back to the step S13 so as to perform the document processing for the next one sentence, and in case the count value of the loop counter is not smaller than the maximum value, the program goes to the END and the document processing of the designated block is finished.

When it is judged in the step S11 that the block designation flag is not set "on", the program goes to the step S16 and the normal document processing such as one sentence processing, entire sentence processing or after cursor position processing is performed, in turn the program goes to the END to finish the document processing of the designated block.

As described above, once one block of the containing a plurality of the source sentence is designated by the operator, all of the sentences in the designated block can be automatically processed without any further operator's instructions. Accordingly, the operability of the document processing in the electronic translation machine can be remarkably improved.

What is claimed is:

1. A designated block processing device for use in a translation machine, comprising:
   block designating means for designating at least a start point and end point of a block in a source document; said block containing a plurality of sentences and said block designating means identifying a head sentence as the start point by a first number and an end sentence as the end point by a second number;
   judging means for judging whether or not the block containing the numbered sentences have already been designated; and
   means for consecutively processing for translation all of the numbered sentence or sentences included in the block when said judging means judges that the block is designated.

2. The device according to claim 1, wherein said block designating means comprising:
   sentence number input means for inputting a head sentence number assigned to the source sentence situated at the beginning of the block and a bottom sentence number assigned to another source sentence situated at the end of the block.

3. The device according to claim 2, wherein said sentence judging means is a flag which is set when the head sentence is designated by said sentence number input means.

4. A designated block processing apparatus for use in a translation machine, comprising:
   sentence number input means for assigning sequentially numbers to a plurality or original sentences in an original document;
   sentence number designating means for designating the sequential number of a head sentence and the sequential number of an end sentence to form a block each including one or more original sentences desired to be processed in the original document and for designating the block of the original sentences to be processed;
   judging means for judging whether or not the sentence numbers of the block to be processed are already designated; and
   means for consecutively processing the sentence included int eh block designated by said sentence number designating means when said judging means judges that the block is designated.

5. The apparatus according to claim 4, further including means for serially, automatically or manually numbering the sentences in the order that the number of the sentence increases as the sentence proceeds.

6. The apparatus according to claim 4, wherein the numbers of the head and end sentences in the desired block of the original sentences are entered by operating keys on a keyboard.

7. The apparatus according to claim 4, wherein the number of a head sentence in the block is substituted for an initial value of a loop counter and the number of an end sentence in the block is substituted for the maximum value of the loop counter.

8. A designated block processing apparatus for use in a translation machine for designating sentences in at least one block, comprising:

sentence number input means for inputting numbers assigned to at least one original sentence in an original document;

sentence number designating means for designating a number of a head sentence and a number of an end sentence in each desired block, said block including at least one original sentence which is to be processed in the original document and for designating each block of the original sentences to be processed;

judging means for judging whether or not the sentence numbers of each block to be processed has already been designated; and means for consecutively processing the sentences including in each block designated by said sentence number number designating means when said judging means judges that each block has been designated.

9. The apparatus according to claim 8, wherein each of the original sentences in the translation machine is serially, automatically, or manually numbered with the head sentence being numbered by a first number and the end sentence being numbered by a second number which is greater than said first number.

10. The apparatus according to claim 8 wherein the numbers of the head and end sentence in the desired block are entered by operating keys on a keyboard.

11. The apparatus according to claim 8 wherein the number of the head sentence is substituted for an initial value of a loop counter and the number of the end sentence is substituted for the maximum value of the loop counter.

12. A designated block processing apparatus for use in a translation machine, comprising:

means for designating at least one block defined by a plurality of numbered sentences by designating a head sentence of the block by a number and an end sentence of the block by a number;

judging means for judging whether or not a block to be translated has been designated; an means for consecutively processing for translations all of the sentences included in the block designated by the means for designating when the judging means judges that the block is designated.

13. The apparatus according to claim 12 wherein the means for designating designates the head sentence by a first number and the end sentence by a second number.

14. The apparatus according to claim 13 wherein the second number is greater in value than the first number.

15. The apparatus of claim 12 wherein the means for designating designates a plurality of blocks.

16. The apparatus according to claim 4, wherein the sentence number input means numbers every original sentence sequentially in the original document, so that a head sentence and an end sentence can be selected for translation by number designation of selected original sentences within the original document.

* * * * *